Figure 1:
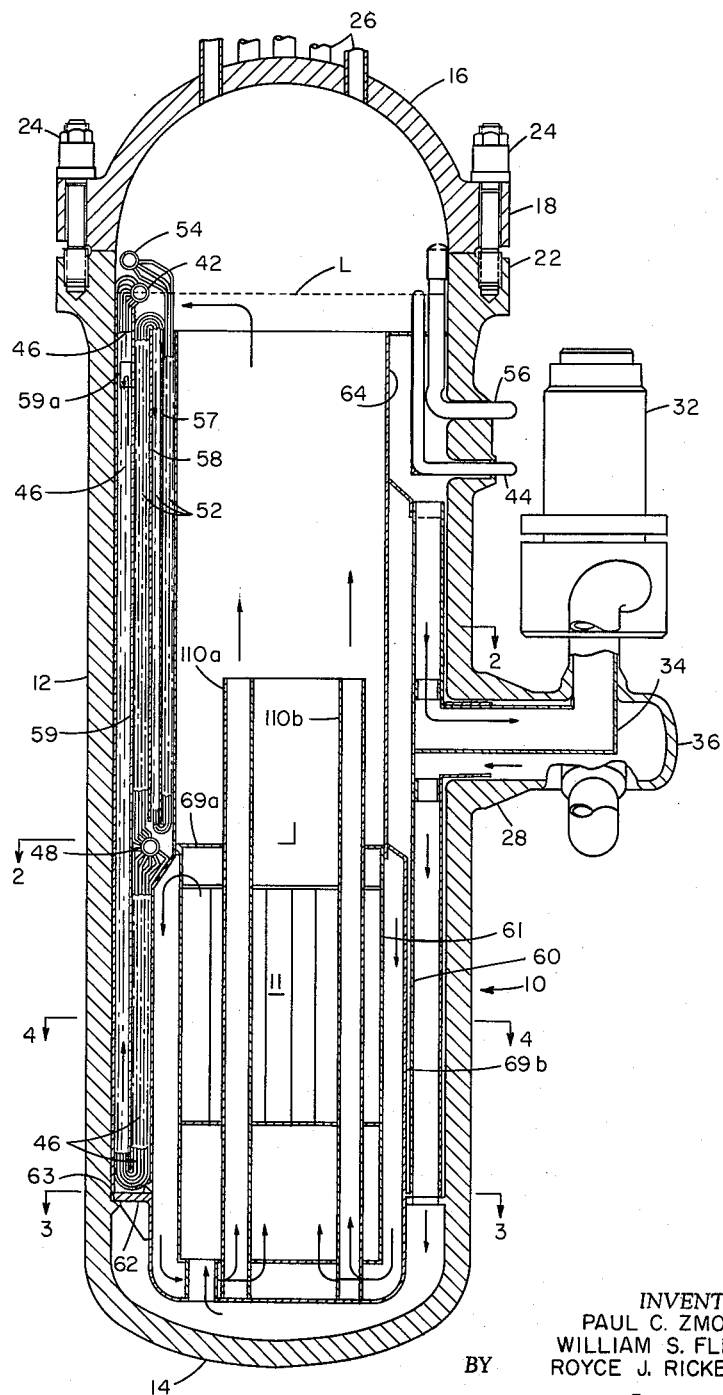

INVENTORS
PAUL C. ZMOLA
WILLIAM S. FLINN
ROYCE J. RICKERT
BY

INVENTORS
PAUL C. ZMOLA
WILLIAM S. FLINN
ROYCE J. RICKERT
BY

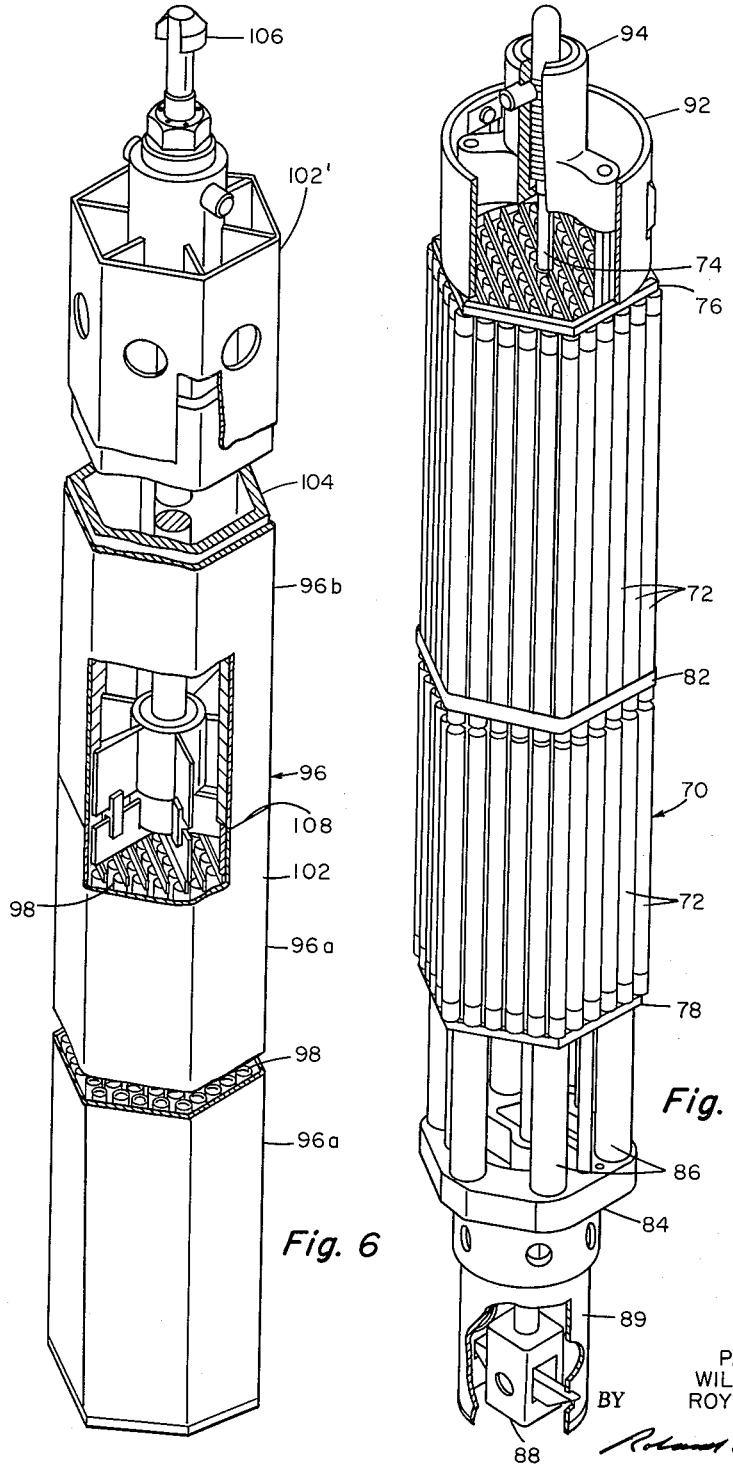

CONTROL PRESSURE BAND

REACTOR LOAD CHARACTERISTICS

LIFETIME OPERATING CONDITIONS

INVENTORS
PAUL C. ZMOLA
BY  WILLIAM S. FLINN
ROYCE J. RICKERT 3,226,300
UNIFIED MODULAR REACTOR PLANT
Paul C. Zmola, Royce J. Rickert, and William S. Flinn, Bloomfield, Conn., assignors to the United States of America as represented by the United States Atomic Energy Commission
Filed Dec. 9, 1963, Ser. No. 329,330
3 Claims. (Cl. 176—29)

The invention described herein was made in the course of, or under, contract AT(30–1)–3061 with the U.S. Atomic Energy Commission.

The present invention relates to a unified nuclear steam generator and more particularly to a unified nuclear fission reactor in which steam generation apparatus is incorporated within the reactor and the need for control rods is eliminated.

Even since the NS *Savannah* maritime reactor covered by U.S. Patent No. 2,982,713 was successfully completed, and even before, extensive efforts have been made to develop and improve the nuclear reactor for maritime applications. Following the NS *Savannah* further improvements were brought about by incorporating the steam generation equipment into the reactor vessel itself thereby reducing the amount of shielding and substantially reducing the space and weight requirements for such a power plant. The use of a self-pressurized primary system was also introduced to permit realization of the full temperature potential of high pressure water reactors and of course it eliminated the need for separate pressurizing apparatus. Higher primary system temperatures resulted in smaller heat exchangers and the capability of delivering superheated steam at higher pressures and temperatures than was previously obtainable.

The present invention represents the next substantial improvement in the maritime pressurized water reactor art. The reactor of this invention is a compact, demand controlled, nuclear steam supply system which operates without the use of control rods. It utilizes the inherent load following capability of a water reactor to a greater degree than has been achieved to date. Reactor power is determined exclusively by steam demand for all operating conditions. In addition to covering the full load range without external reactor controls, the plant provides similar self-regulation for changes in the nuclear characteristics of the core due to fuel burnup. No controls need be imposed on the system to regulate the operating reactor.

In accordance with a preferred embodiment of this invention, the reactor fuel is uranium dioxide contained within stainless steel tubing. Radial power flattening in the core is obtained by use of two enriched zones, and burnable poison is used to minimize the lifetime reactivity variation. A once-through heat exchanger is arranged along the inside periphery of the reactor vessel and is comprised of a plurality of independent circumferential segments, all but one of the segments being capable of providing full steam flow. The core is arranged to be refueled without removal of the heat exchangers, and individual segments of the heat exchanger can be replaced without disturbing the others. Primary water flow through the core is effected by pumps located externally of the reactor vessel, and the primary system is self-pressurized without any external controls imposed on the system.

It is thus a first object of this invention to provide a pressurized water reactor controlled by steam demand instead of control rods.

Another object of the invention is the provision of a compact nuclear reactor having an integral steam generator and superheater.

A further object is a pressurized water reactor with integral steam generator and a self-pressurized primary system without any external controls.

Still another object of the invention is a pressurized water reactor relying on both a negative Doppler coefficient and negative moderator temperature coefficient for effecting self-control to meet the steam demands and to insure shut-down in the event of loss of secondary system steam or power.

Figure 2:
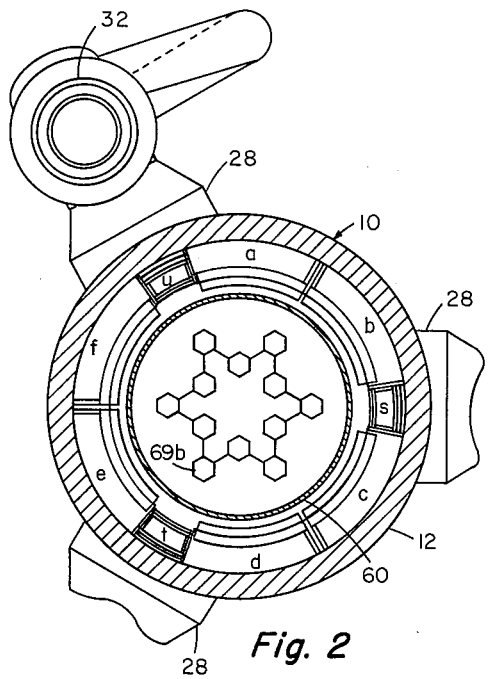
Figure 3:
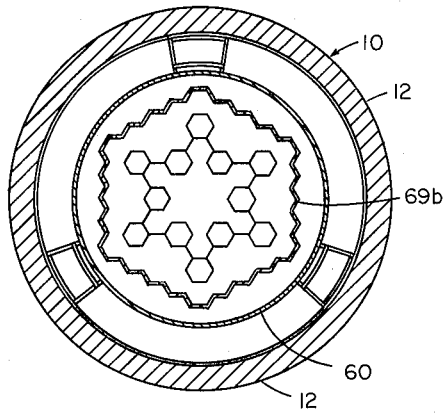
Figure 4:
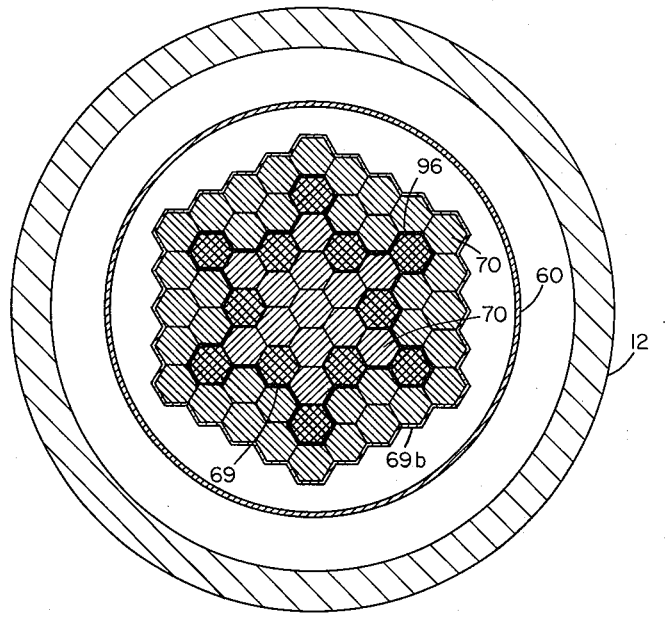
Figure 9:
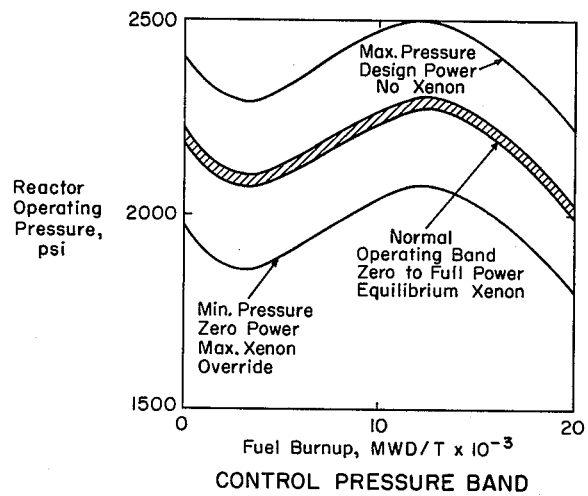
Figure 7:
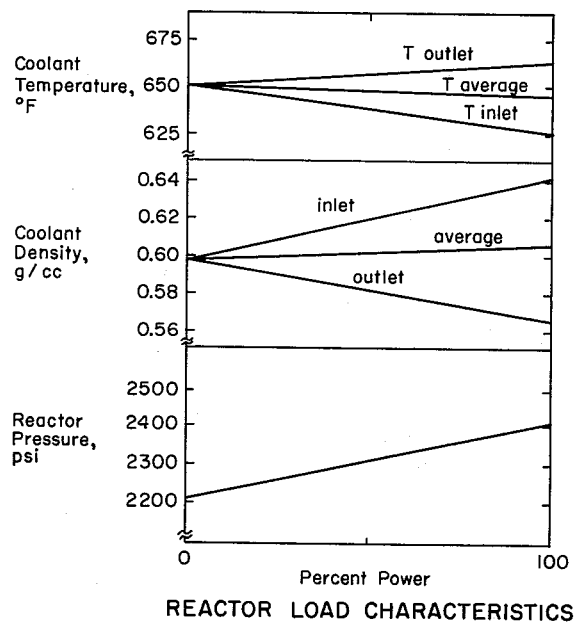
Figure 8:
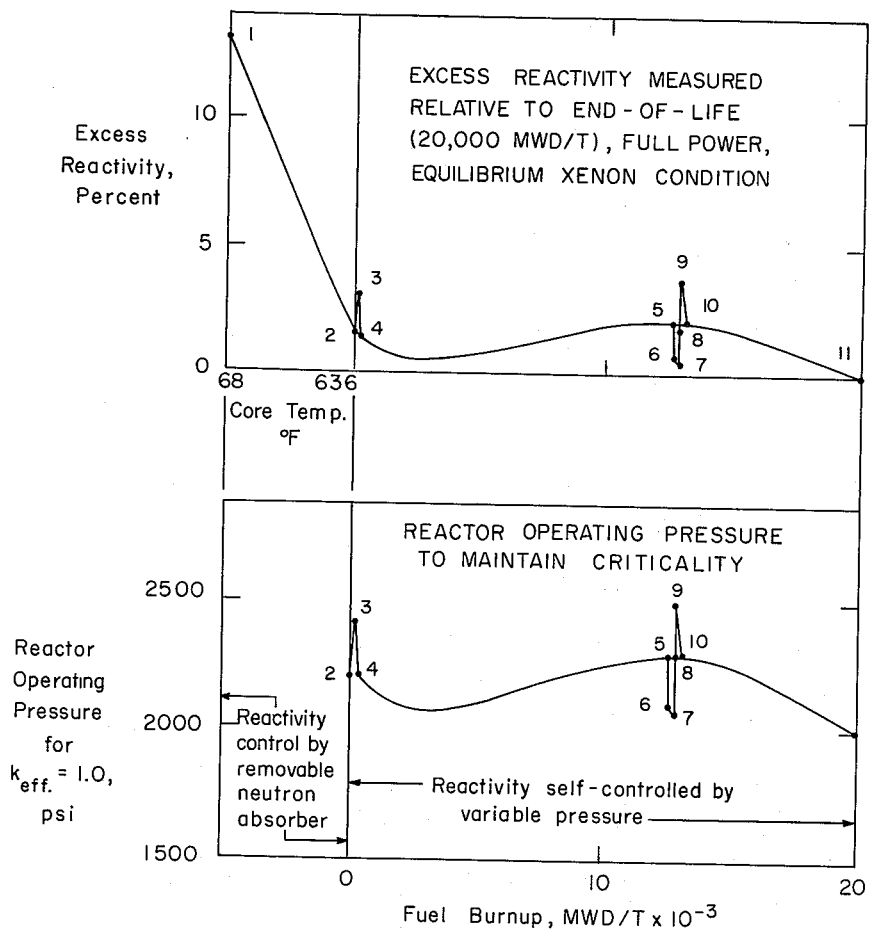

Other objects and advantages of this invention will hereinafter become more obvious from the following description of a preferred embodiment of this invention taken with reference to the accompanying drawings in which:

FIG. 1 is an elevation in section of the reactor pressure vessel;
FIG. 2 is a view along 2—2 of FIG. 1;
FIG. 3 is a view along 3—3 of FIG. 1;
FIG. 4 is a cross section of the core in FIG. 1;
FIG. 5 is a partially cut-away isometric view of a stationary fuel clusters;
FIG. 6 is a partially cut-away isometric view of a cold shutdown assembly;
FIGS. 7, 8 and 9 are graphs of the reactor load and other characteristics of the reactor shown in FIGS. 1–6.

Referring to FIGS. 1 and 2 there is shown reactor assembly 10 having a core 11 of fissionable fuel, the former consisting of a cylindrical shell or vessel 12 closed at the bottom by an elliptical head 14 and at the top by a hemispherical top head 16. Head 16 has a flange 18 for mating with flange 22 of vessel 12 and a plurality of bolts 24 for holding head 16 and vessel 12 together. Top head 16 is provided with a plurality of access ports 26 through which poison rods can be inserted for prolonged cold shut-down periods and for moving the movable fuel clusters as described below.

Vessel 12 has three equally spaced primary coolant nozzles 28, all located in the same horizontal plane above the core. Each nozzle 28 is provided with a pump 32 with an inlet 34 and an outlet 36 for circulating the primary liquid through vessel 12 as will be later more particularly described.

Within vessel 12 there is shown core 11 having a right cylinder shape located within a core structure to be described later and surrounded by the steam generation equipment now to be described. The construction of core 11 will be described further below. An inlet header 42 annular in arrangement is located as illustrated just below flange 22 along the inside wall of vessel 12. A feedwater inlet pipe 44 penetrating the wall of vessel 12 as shown supplies feedwater to header 42. The latter supplies water to boiler section 46 which consists of a large number of tubes in parallel extending down to a level slightly below the bottom of core 11 making a 180° bend and extending up to the intermediate header 48 about half way up the steam generation equipment. The steam quality in header 48 is dry saturated steam at normal operating conditions. Extending up from intermediate header 48 and inside of boiler section 46 are a reduced number of tubes comprising the superheater section 52. These tubes extend upward to just below inlet header 42, make a 180° reverse bend downward to just above intermediate header 48, make another 180° reverse bend, and then continue upward to outlet header 54 which is located just above inlet header 42. A steam outlet pipe 56 carries the superheated steam from outlet header out of reactor vessel 12. Baffle plates 57, 58, and 59 between adjacent sections of steam tubes direct the flow of primary fluid flow as will be described below.

The steam generation equipment just described actually consists of six annular sections indicated by *a*, *b*, *c*, *d*, *e*, and *f* in FIG. 2. Each alternate pair of sections are separated by a chute, the three chutes being designed *s*, *t* and *u* as illustrated. The chutes are actually vertical spaces through which primary fluid flows from the steam generators to the pumps and thence to the core as will be seen below. The chutes are divided into lower and upper sections with the upper section supplying water to the inlets of the pumps and the lower sections receiving water from the pump outlets. A typical opening 59a into a chute is shown in FIG. 1.

Within vessel 12, surrounded by the previously described steam generation equipment, is a circular structure 60 supported by annular plates 62 beneath the steam generation sections. Plates 62 are carried by shoulders 63 formed on the inside wall of vessel 12. A cylindrical chimney 64 extends down to below plates 62 thereby providing for a central section through vessel 12 for upward primary fluid flow and an annular section for generally downward primary fluid flow. The steam generation equipment thus is located in the annular section. A hexagonal grid structure 61 is designed to support an array of fuel rod clusters as shown in FIG. 4. It will be seen from FIG. 4 that the outer fuel assemblies, those located outside of a flow divider 69 receive the first pass of coolant (upwardly). The coolant leaving the first pass fuel assemblies strikes baffle plate 69a, makes a 180° turn and flows downward inside of the circular structure 60 but outside of the core flow shroud 69b. The coolant re-enters the bottom of the core into the second pass fuel assemblies located inside of flow divider 69. The second pass of coolant is also upward. All of the first fuel elements are outside of flow divider 69. The second pass fuel elements are those within flow divider 69. The single hatched elements are the stationary fuel clusters 70 to be described below while the cross-hatched elements 96 represent the locations of the movable fuel clusters. As will be seen below, the fuel rods are stainless steel fuel-supported tubes containing low enrichment powdered $UO_2$ and are spaced on a triangular pitch to form the hexagonal clusters. Some of the clusters are movable and each of these is surmounted by a hollow water-filled neutron absorbing section to form a cold shutdown assembly which can be moved vertically within a guide tube, as will be seen from the more detailed description to follow.

Referring to FIG. 5, each stationary fuel cluster 70 is made up of a triangular pitched array of fuel rods 72 plus a central latching rod 74 of the same external dimensions as a fuel rod. Some of the rods 72 may contain burnable poisons for long term reactor control. Fuel rods 72 are supported in spaced relationship by upper and lower support plates 76 and 78 and are held together by one or more cluster bands 82. Below support plate 78 a bottom end fitting 84, with support tubes 86 and a toggle latch 88 enclosed in a cylindrical extension 89 are used to anchor the lower end of cluster 70 into the support structure 61 while the upper end is held in place by a top end fitting 92 and a handling fitting 94 of convenient design.

As was pointed out previously, some of the fuel assemblies are movable and contain a neutron absorbing section for shutdown purposes. Referring to FIG. 6 there is seen such a control or movable fuel assembly 96 containing fuel rods 98 within a sheath 102 forming fueled section 96a. Above fuel elements 98 is an enclosed absorber section 104 forming the upper section 96b. A top end fitting 106 extending above the end of shroud 102' in the upper section 96b is used to move assembly 96 up or down for the purpose described below. The fueled portion of assembly 96 ends at 108. The length of fueled section 96a is the same as that of the length of fuel rods 72 in stationary fuel clusters 70 so that during normal operation of reactor 10, the upper, poison containing section of cluster 96 is above the core region and does not interfere with reactor operation. When reactor 10 is shut down, movable clusters 96 are lowered a sufficient distance to submerge the upper poison containing section 96b into the core region to stop the fission process. Referring back to FIG. 1 there is shown a pair of typical hexagonal channels 110a and 110b which would contain assemblies such as 96 shown in FIG. 5 with extensions to permit lowering of the assemblies to shut down reactor 10 and raising of the absorber sections above the core for normal operation.

As indicated by the arrows in FIG. 1 to show the direction of primary fluid flow, structure 60 supporting core 11 provides for two passes of coolant through the core. Primary water is forced by pumps 32 through inlet nozzles 36 into chutes s, t and u for flow downwardly along the inside wall of pressure vessel 12. Beneath the core structure 60, the water reverses direction and flows upwardly through core 11 in a first pass. Core structure 60 has openings below and passageways to flow the water past the fuel assemblies in the outer region of core 11 as indicated in FIG. 4 and as previously described. The water leaving the second pass of core 11 at the top fills vessel 12 to the level indicated at L and some passes over the top of chimney 64 for flow downwardly in and around the spaces between the steam generating equipment described and shown in FIG. 1. Baffle plates 57, 58 and 59 direct the water down through superheater section 52 to above plates 62 where the water flows around the baffle plate 59 and upwardly to leave the steam generation region through openings 59a into adjacent flow chutes s, t, and u where the water passes through outlet nozzles into pumps 32.

Core 11 is operated under self-pressurization due to the steam space formed above the level L of the primary water. This occurs at all power levels, the mixed mean temperature of the water above the core outlet at steady state being equal to the saturation temperature corresponding to the primary system pressure. The core is divided into two enrichment zones to bring about radial power flattening. Power peaking factors are further reduced by operation with the absorber portions of all the cold shut down or movable fuel assemblies 96 out of the core and all of the fuel in the core. Coolant flow distribution is thereby improved. The burnable poisons used minimize reactivity variation and this reduces operational pressure changes required to compensate for fuel burnup.

A moderator-to-fuel volume ratio of 1.35 is selected for this core to help obtain the compact size and self-control features of the plant.

The power distribution in the core influences both the rated power and the life of the fuel. Reduction of the maximum-to-average power ratio permits a smaller core and also reduces the maximum-to-average burnup of the fuel. This allows a higher average burnup to be attained without increasing the maximum fuel burnup. The elimination of all control rods from the core during the operation is a major factor in reducing power peaks. This feature lowers the maximum-to-average heat flux ratio in the core by 20 to 25 percent.

Two zones of fuel enrichment are used to adjust the radial power distribution to the desired shape. Rather than merely flattening the power to obtain the lowest maximum-to-average value, the zoning is selected to best utilize the two-pass coolant flow. An enrichment ratio of 1.6 between the outer and inner zone is used to produce a lower power peak in the second pass than in the first pass where the lower coolant temperature permits higher heat flux. The cooler water in the first pass, outer zone, also contributes to the flattening of the core power thus reinforcing the effect of the two enrichment zones.

The type of reactivity control places a premium on minimizing the variation of reactivity over the life of the core. In the ideal core this variation would be zero and the core would remain critical at a fixed temperature and pressure throughout life. This invention utilizes fixed burnable poison within the fuel clusters to reduce the reactivity variation due to fuel depletion and fission product build-up over the full life of the core. The alternative approach of fuel shuffling with partial core refueling requires frequent shut down and severely restricts the design latitude available to shape the power distribution with zoned enrichment.

In starting up of reactor 10, the reactivity change between room temperature and operating conditions is compensated by raising the cold shut down or movable fuel assemblies 96 so that the fuel rods 98 fully occupy the core region and the absorber sections 104 are located above and out of the core region. All control in the operating range is provided by the inherent characteristics of the reactor. Self-initiated changes in the moderator temperature and density add or subtract reactivity as required to keep the core just critical at all values of load demand and during all changes in core reactivity resulting from fuel burnup, i.e., loss of fuel and burnable poison and buildup of plutonium and fission products.

Reactivity control over the operating range is derived from the inherent negative temperature coefficient of the moderator-coolant with no control rods in the core. The self-pressurized reactor will respond to compensate for any reactivity change automatically with no imposed controls. If the reactivity drops below critical due to fuel burnup, for instance, the nuclear power generation will momentarily be reduced. However, continued withdrawal of heat through the heat exchanger to satisfy the steam demand will lower the primary coolant temperature adding reactivity, and the core will return to the first critical condition. If reactivity should rise, the excess power generated will raise the moderator temperature to eliminate the excess reactivity. In compensating for these changes, the reactor pressure will vary in accordance with the core outlet temperature. This effect is illustrated in FIG. 7 showing the reactor characteristics between zero and 100 percent design power. The reactor is designed to provide the necessary reactivity control over the core life with the primary system pressure between 2000 and 2500 p.s.i. at design power. This type of reactivity control results in reduced absorber element costs. Since the absorber sections of the movable fuel assemblies are not in the core during operation, the absorber is not depleted. Less expensive absorber material can be used and the absorber section of the shutdown assemblies need not be replaced because of burnup.

The data in FIGURE 7 represents a series of quasi-steady state operating conditions encountered when the demand load is slowly varying, i.e., changes are made over a period of minutes. The plant will also respond smoothly to rapid manuevering since the effect of the negative temperature coefficient is damped by another inherent characteristic The Doppler effect and small amount of boiling in the core act to retard changes in reactor power initiated by changes in the temperature of the coolant returning from the heat exchanger. This provides a strong stabilizing influence and is also a safety feature. An explanation of the stabilizing influence of these effects is best illustrated by an example. As the turbine demands more steam, the pressure and temperature of the secondary side of the heat exchanger begin to fall. More heat is transferred from the primary coolant, thus reducing the temperature of the water returning to the reactor core. As cooler water enters the core, the reactivity begins to increase and the power level starts to rise. The outlet temperature of the core then begins to increase. When hotter water reaches the heat exchanger, supplying the load demanded by the turbine, the coolant temperature leaving the heat exchanger ceases to fall. Since time is required for the water to leave the core, traverse the flow path and return, the new temperature conditions in the heat exchanger are not immediately reflected in the reactor core. If coolant temperature were the only parameter influencing the reactivity, the reactor power would rise above the demand power and eventually fall back to the new level as the new temperature conditions stabilized through the flow loop. The Doppler effect and small amount of boiling in the core have a damping effect on this overshoot because they resist the rise in nuclear power. By introducing a lag in the response of the reactor core to steam demand, there is more time for the new temperatures in the heat exchanger to be reflected in the reactor core. It is this lag in response which damps out any tendency to overshoot the amount of power demanded at the turbine. Thus, the primary loop, consisting only of the reactor core, pumps, and once-through heat exchanger, forms a self-contained power regulating system with the negative feedback and damping provided by the inherent characteristics of the components. No control functions need be imposed on the system.

In addition to covering the entire load range without external reactor controls, this reactor provides a similar self-regulation for changes in nuclear characteristics due to fuel burnup. Various typical conditions during the life of the core are shown in FIGURE 8. The upper curve shows the excess reactivity calculated with the moderator conditions held fixed at the end-of-life, design power condition, i.e., core outlet at 636° F., 2000 p.s.i. The lower curve gives the reactor operating pressure required to eliminate any excess reactivity during life by virtue of the negative temperature coefficient. The self-pressurized reactor is free to automatically seek this control pressure yet is held in check by the temperature and Doppler coefficients.

The sequence of numbered points in FIGURE 8 traces out a series of conditions which are typically encountered in operation. Between points 1 and 2 the reactor is brought from room temeprature to the hot, zero power condition by fully withdrawing the absorber sections and replacing by the fuel sections of the movable fuel assemblies. After this is accomplished, all reactivity control is provided by self-regulated changes in the reactor temperature and pressure to meet the demand load on the steam generators. The change from zero to full load, point 2 to point 3, is the same change described in FIGURE 7. As equilibrium xenon poisons are established in one or two days, the pressure drops to point 4 and follows the curve shown to point 5 as fuel burnup proceeds.

Points 5 to 10 illustrate the changes which occur if the power demand were reduced to zero for a period of 24 to 48 hours, allowing the xenon poisons to decay away, and then brought back to full power. The pressure drops from point 5 to 6 as the power demand is removed, fails further to point 7 as the xenon poisoning passes through its peak about five hours later, and then rises to point 8 as the xenon concentration decays to zero. Returning to full power demand, the pressure will rise to point 9 and then fall to point 10 as full power equilibrium xenon poison is re-established. The design life in the case of 20,000 Mwd./t. fuel burnup is reached at point 11. At the discretion of the operator, the life of the core could be stretched beyond this value merely by continuing to withdraw power and allowing the reactor pressure to fall below 2000 p.s.i. Of course, this would eventually be limited by the reduced temperature of the steam leaving the steam generator.

The series of points, 5 to 10, illustrating the changes from full power to zero and back to full power demand are shown at the maximum reactivity condition occurring during the life of the core. If this series is repeated at all other burnups along the curve, it will trace out the envelope embracing all possible operating conditions attainable during the core life. This envelope is shown in FIGURE 9. The upper curve is one passing through points 3 and 9 in FIGURE 8. The lower curve is defined by point 7. These are the upper and lower bounds reached only temporarily during the worst transient xenon conditions encountered. The normal operating band shown includes point 2, 4, 5, 8, 10 and 11, i.e., all power levels at their corresponding equilibrium xenon concentrations. It is quite narrow since the pressure increase from zero to a given power level is nearly counterbalanced by the pressure decrease due to the establishment of the equilibrium xenon concentration. Thus, the normal operating band lies in the range from 2300 to 2000 p.s.i. over the entire core life while the maximum reactor operating pressure of 2500 p.s.i. is encountered near mid-life if full power is demanded with no xenon present in the core.

It is thus seen that there has been provided a compact and integrated nuclear fission steam generator of unique design and control characteristics. With the elimination of the need for control rods it provides the potential to further reduce the size and weight of the power plant by avoiding the necessity of providing extended rods with space to accommodate the latter as well as drive and control mechanisms. It has further been made possible to reduce the frequency of reactor shutdowns by elimination fuel shuffling for lifetime reactor control. These features as well as others described above provide a most efficient and compact design capable of very long life between refuelings. While only a preferred embodiment has been described it is understood the invention to be limited only by the scope of the appended claims.

We claim:

1. A nuclear fission reactor comprising a pressure vessel, a core of fissionable fuel assemblies mounted within said pressure vessel, said assemblies consiting of stationary fuel assemblies and movable fuel assemblies, each of said movable fuel assemblies consisting of a lower section containing fuel elements extending the length of said core and an upper section containing a neutron absorbing material, all of the movable neutron absorbing material of said reactor being contained within the upper sections of said fuel assemblies, each of said movable fuel assemblies being movable between an upper operating position wherein said lower section is located within said core and the upper section extends above said core to permit power operation of said reactor and a lower shut down position wherein said lower section extends below said core and the upper section is within said core to prevent operation of said reactor, said core being divided into outer and inner zones of $U_{235}$ enrichment, the enrichment ratio is between the outer zone and inner zone being about 1.6, steam generating means located within said vessel occupying an annular space surrounding said core for receiving secondary water coolant and producing superheated steam, and means for pumping primary water coolant and moderator into said vessel and forming a self-pressurized steam space in the upper region of said vessel, said primary coolant being circulated in two passes through said core and through said steam generating means to transfer heat of fission from said core to said secondary water coolant, said primary coolant making its first pass through the outer enrichment zone and its second pass through the inner enrichment zone, thereby tending to flatten the power distribution across said core, said reactor during normal operation having each of said movable fuel assemblies in its upper operating position, said reactor thereby operating normally without the presence of control rods in the core.

2. The nuclear reactor of claim 1 in which the outer core zone consists of stationary fuel assemblies and the inner zone consists of both stationary and movable fuel assemblies.

3. The nuclear reactor of claim 2 in which the moderator to fuel volume ratio is about 1.35.

References Cited by the Examiner

UNITED STATES PATENTS

| | | | |
|---|---|---|---|
| 2,857,324 | 10/1958 | De Boisblanc et al. | 176—86 X |
| 3,108,937 | 10/1963 | Kumpf et al. | 176—61 |
| 3,150,051 | 9/1964 | Ammon | 176—65 X |
| 3,151,034 | 9/1964 | Douglass et al. | 176—61 X |
| 3,163,585 | 12/1964 | Metcalfe et al. | 176—65 X |

FOREIGN PATENTS 1,225,589  2/1960  France.

REUBEN EPSTEIN, *Primary Examiner.*

L. DEWAYNE RUTLEDGE, *Examiner.*